(12) United States Patent
Ozawa et al.

(10) Patent No.: US 6,648,399 B2
(45) Date of Patent: Nov. 18, 2003

(54) FRONT END PANEL

(75) Inventors: Ikuo Ozawa, Toyoake (JP); Toshiki Sugiyama, Kariya (JP); Harumi Okai, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/901,532

(22) Filed: Jul. 9, 2001

(65) Prior Publication Data

US 2001/0045761 A1 Nov. 29, 2001

Related U.S. Application Data

(63) Continuation of application No. PCT/JP00/07972, filed on Nov. 10, 2000.

(30) Foreign Application Priority Data

Nov. 10, 1999 (JP) .............................. 11-320186

(51) Int. Cl.[7] .............................................. B60K 11/04
(52) U.S. Cl. ...................................... 296/194; 296/208
(58) Field of Search ................................ 296/191, 194, 296/203.02, 208; 293/115; 361/678, 690, 707; 307/10.1

(56) References Cited

U.S. PATENT DOCUMENTS 5,271,473 A * 12/1993 Ikeda et al. ............. 296/194 X
5,348,114 A * 9/1994 Yamauchi .......... 296/203.02 X
6,273,181 B1 * 8/2001 Matsui et al. ............... 165/185

FOREIGN PATENT DOCUMENTS

| EP | 0768212 A2 | * | 9/1996 |
| FR | 2798457 A1 | * | 9/1999 |
| JP | 61-141165 U | | 9/1986 |
| JP | A-7-112616 | | 5/1995 |
| JP | A-7-300052 | | 11/1995 |
| JP | 409301095 A | * | 11/1997 |
| JP | A-10-252470 | | 9/1998 |

* cited by examiner

*Primary Examiner*—D. Glenn Dayoan
*Assistant Examiner*—Jason Morrow
(74) *Attorney, Agent, or Firm*—Harness, Dickey & Pierce, PLC

(57) ABSTRACT

The radiating section (830) of the control unit (800) is exposed to air flowing in the intake path (710) formed in the panel body (450). Due to the foregoing, it is possible to cool the control unit (800) by air (about 35° C.), the temperature of which is lower than the temperature of air (about 60° C.) which has passed through the condenser (200) and the radiator (100). Accordingly, the cooling effect (cooling capacity) can be enhanced. Therefore, the size of the radiating section (830) can be reduced, and the structure of the control unit (800) (the mounting structure of the electronic parts (810)) can be simplified. As a result, the manufacturing cost of the control unit (800) can be reduced.

10 Claims, 5 Drawing Sheets

FRONT END PANEL

CROSS-REFERENCE TO RELATED APPLICATIONS

This application is based upon and claims priority from Japanese Patent Application No. 11-320186, filed Nov. 10, 1999, the contents being incorporated therein by reference, and is a continuation of PCT/JP00/07972, filed Nov. 10, 2000.

TECHNICAL FIELD

The present invention relates to a front end panel to which front end parts of a vehicle, including at least a radiator, which are arranged on the front end of an engine compartment (in a vehicle), are incorporated.

BACKGROUND ART

A control unit, for controlling electric equipment such as an electric fan used for a radiator and a headlight, is usually arranged in an engine compartment. Therefore, the control unit is exposed to air at a high temperatures which has passed through the radiator. Accordingly, it is difficult to cool the control unit sufficiently. In order to solve the above problems, it is common to arrange, as a countermeasure, that the size of a radiating section of the control unit is increased or the profile of the control unit is made complicated.

However, when the above countermeasure is taken, since the size of the radiating section of the control unit is increased or the profile of the control unit is made complicated, it becomes difficult to reduce the manufacturing cost of the control unit.

DISCLOSURE OF THE INVENTION

The present invention is intended to solve the above problems. It is an object of the present invention to reduce the manufacturing cost of the control unit.

In order to accomplish the above object, the present invention provides a front end panel onto which vehicle front end parts (123), including at least a radiator (100), which are arranged on the vehicle front end side, are incorporated, comprising: an air path (710) for providing an air flow to the rear end side of the vehicle while the air makes a detour round the radiator.(100), the air path being arranged in a panel body section (450) to which the vehicle front end parts (123) are attached; and a unit attaching section (412) to which a control unit (800) for controlling electric equipment is attached, the unit attaching section (412) being arranged in the panel body section (450), wherein the control unit (800) is cooled by the air flowing in the air path (710).

Due to the foregoing, the control unit (800) can be cooled by the air, the temperature of which is lower than the air at a high temperature which has passed through the radiator (100). Therefore, the cooling effect (cooling capacity) can be enhanced. Accordingly, the structure of the control unit (800) can be simplified, and the manufacturing cost of the control unit (800) can be reduced.

In another embodiment of the present invention, there is provided a front end panel in which the panel body section (450) is made of resin, the control unit (800) is composed of a mounting board (820) for mounting electronic parts (810), a casing (860) for accommodating the mounting board (820) and a radiating section (830) made of metal for radiating heat generated in a casing (860), and the radiating section (830) comes into contact with a portion of the panel body (450) so that a labyrinth structure (850) is formed and the air path (710) side of the casing (860) is closed.

Due to the foregoing, it is possible to prevent water such as rain water, which has entered into the air path (710), from proceeding into the casing (860). Therefore, it is possible to prevent the mounting board (820) from being covered with water.

The present invention will be more fully explained in the detailed description of the preferred embodiment of the present invention with reference to the accompanying drawings.

PREFERRED EMBODIMENTS FOR CARRYING OUT THE INVENTION (First Embodiment)

In this embodiment, the vehicle front end parts, which are mounted on the vehicle front end section, include: a radiator for cooling a coolant of a vehicle engine (internal combustion engine); a condenser of a refrigerating cycle for vehicle use (air-conditioner); and a fan unit for sending cooling air to the radiator and condenser.

Figure 1:
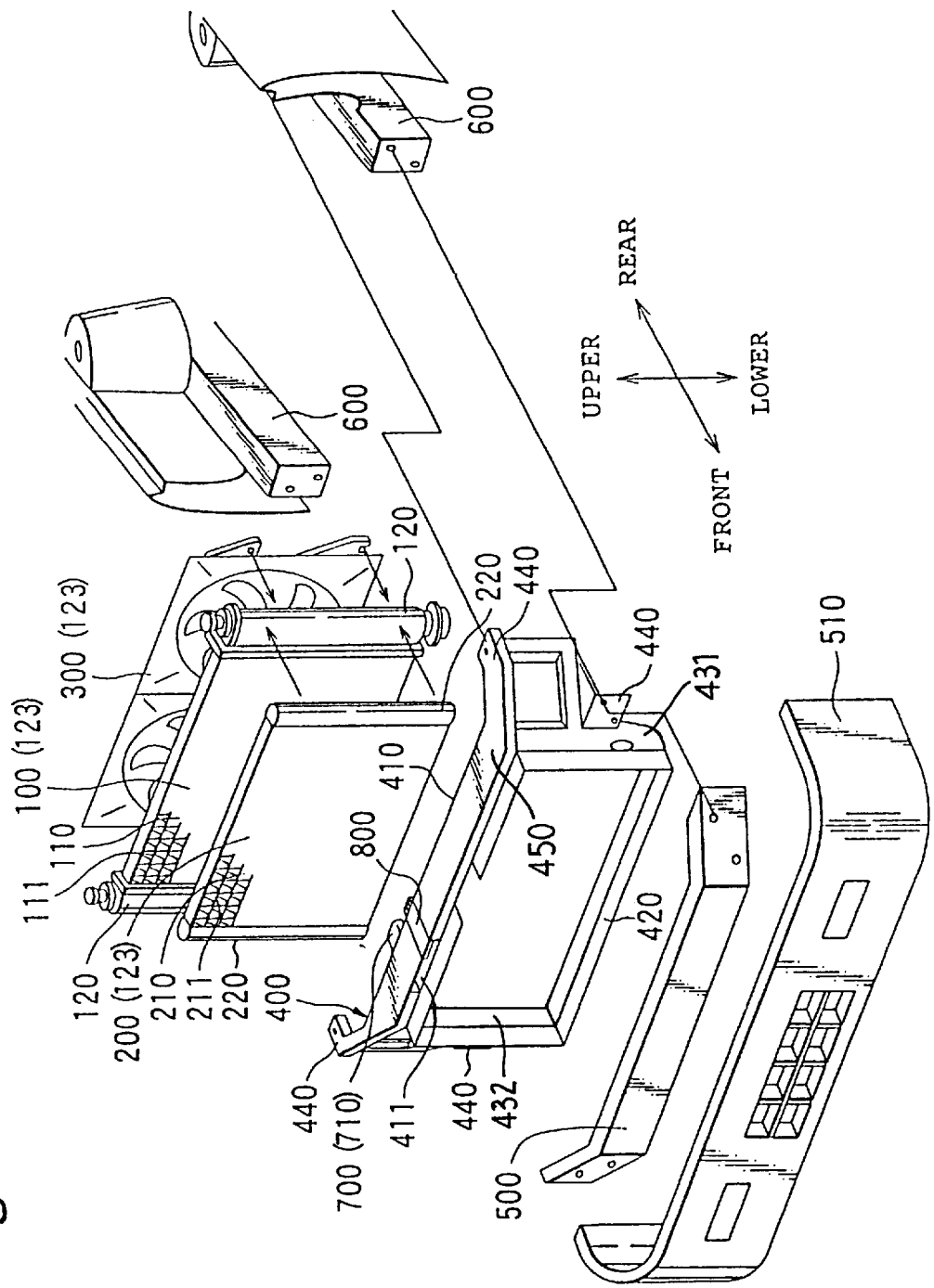
FIG. 1 is an exploded perspective view showing a front end section of a vehicle into which a front end panel of the first embodiment of the present invention is incorporated.

FIG. 1 is an exploded perspective view of the front end structure of this embodiment.

In FIG. 1, reference numeral 100 is a radiator, reference numeral 200 is a condenser, and reference numeral 300 is a fan unit. In this connection, the radiator 100, condenser 200 and fan unit 300 are hereinafter generally called vehicle front end parts 123.

In this connection, the radiator 100 is a well known multi-flow type heat exchanger including: a radiator core 110 composed of a plurality of radiator tubes 111 in which coolant flows; and radiator tanks 120 arranged on both end sides of the radiator tubes 111 in the longitudinal direction, the radiator tanks 120 communicating with the radiator tubes 111.

The condenser 200 is a well known multi-flow type heat exchanger, which is composed in the same manner as that of the radiator 200, including: a condenser core 210 composed of a plurality of condenser tubes 211 in which refrigerant flows; and condenser tanks 220 arranged on both end sides of the condenser tubes 211 in the longitudinal direction, the condenser tanks 220 communicating with the condenser tubes 211. In this connection, in this embodiment, both the heat exchangers 100, 200 are arranged in a vehicle in such a manner that the tubes 111, 211 are extended in the horizontal direction and the tanks 120, 220 are extended in the vertical direction (perpendicular direction).

Figure 2:
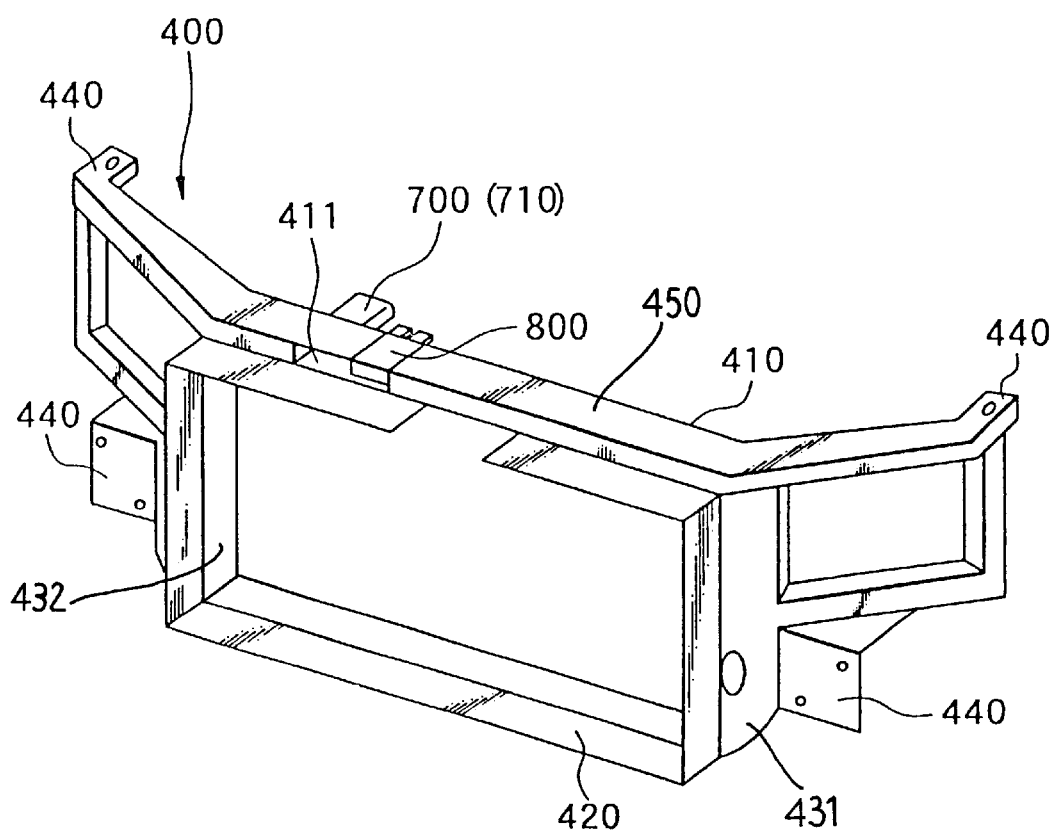
FIG. 2 is a perspective view showing a front end panel of the first embodiment of the present invention.

Reference numeral 400 is a front end panel (referred to as a panel hereinafter) made of resin to which vehicle front end parts 123 are incorporated and fixed. As shown in FIG. 2, this panel 400 includes: an upper beam member 410 located on the upper side and extended in the horizontal direction; a lower beam member 420 located on the lower side and extended in the horizontal direction; and pillar sections 431, 432 extended in the vertical direction and connected with both the beam members 410, 420. The rectangular frame including both the beam members 410, 420 and the first 431 and the second pillar section 432, and the bracket section 440 compose the panel body section 450.

In this connection, the cross sections of both the beam members 410, 420 and the first pillar section 431 and the second pillar section 432 have a substantially C-shape which is open to the rear side of the vehicle. Inside these members 410, 420, 431, 432, there are integrally provided a plurality of rib walls (not shown) for enhancing the torsional rigidity of both the beam members 410, 420 and the first pillar section 431 and the second pillar section 432 in such a manner that these rib walls partition the substantially C-shaped groove into a plurality of spaces.

Figure 3:
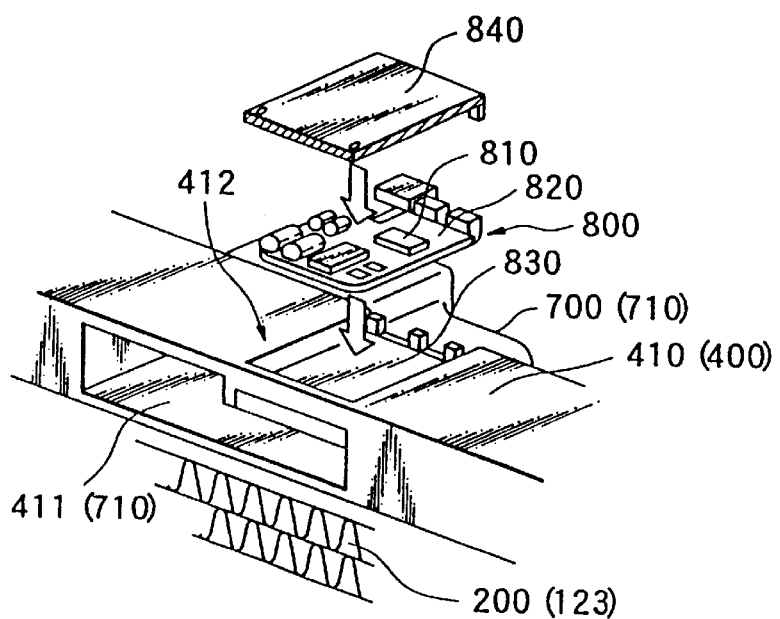
FIG. 3 is an exploded enlarged view of a unit attaching section of the first embodiment of the present invention.

As shown in FIG. 3, the opening side of the upper beam member 410 is connected with the intake duct 700 made of resin for guiding air (intake air) onto the intake side (to the intake manifold) of a vehicle running internal combustion engine (not shown) which is arranged on the rear side of the vehicle with respect to the upper beam member 410. On the other hand, as shown in FIGS. 1 to 3, the outside air introducing port 411 for introducing outside air from the front side of the vehicle into the intake duct 700 is formed in the upper beam member 410 on the front side of the vehicle.

Therefore, as shown in FIG. 3, intake air to be sucked into the internal combustion engine is taken, from the outside of the engine compartment into which the internal combustion engine is incorporated, into the intake duct 700 and guided onto the intake side of the internal combustion engine which is located on the rear side of the vehicle with respect to the panel 400 while the intake air makes a detour round the condenser 200 and the radiator 100. For the above reason, the air path from the outside air introducing port 411 to the intake duct 700 via the inside of the upper beam member 410 (panel body section 450) will be referred to as an intake path 710, hereinafter.

In the upper portion of the upper beam member 410 (panel body 450), there is provided a unit attaching section 412 to attach a control unit 800 for controlling electric equipment mounted in the front section of the vehicle such as a fan unit (electric fan) 300, headlights (not shown), turn signals and horn.

In the unit attaching section 412, the radiating section 830 made of metal (aluminum in this embodiment), which will be described later, is integrated with the panel body section 450 by means of insert molding simultaneously when the panel body section 450 is molded, so that the radiating section 830 can be exposed to air flowing in the intake path 710.

Figure 4:
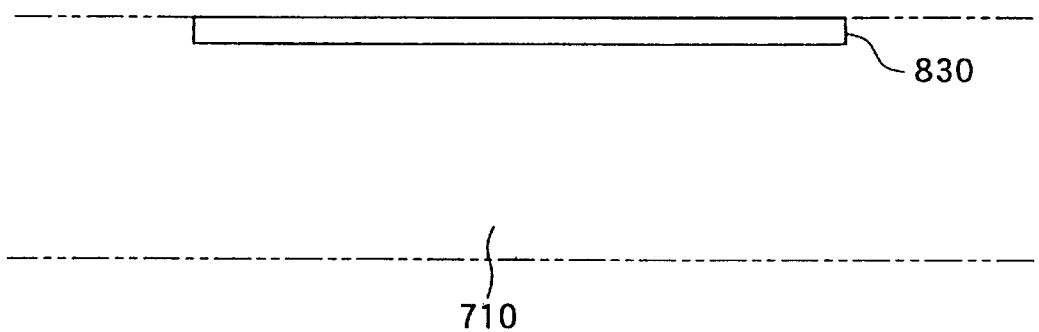
FIG. 4 is a front view of a radiating section of the first embodiment of the present invention.

In this connection, the control unit 800 includes: electronic parts 810 composed of semiconductor elements such as an integrated circuit (IC) and others; a mounting board 820 on which the electronic parts 810 are mounted; and a radiating section 830 (shown in FIG. 4) for radiating heat generated from the electronic parts 810.

In this connection, the control unit 800 (electronic parts 810 and mounting board 820) is attached to the panel body 450 (upper beam member 410) and water-tightly covered with the cover 840. In this connection, there is provided a seal member such as packing or liquid packing in the gap formed between the cover 840, which is attached to the panel body 450 by a fastening means such as a screws, and the panel body 450 (upper beam member 410).

Reference numeral 500 is a bumper reinforcement (referred to as a bumper hereinafter) made of metal which forms a buffer member on the front side of a vehicle. Reference numeral 510 is a bumper cover made of resin which covers the bumper 500. The bumper 500 and panel 400 are fixed to the side body (side member) 600 of the vehicle with a fastening means such as bolts. The vehicle front end parts 123 are incorporated onto the panel 400 in such a manner that the condenser 200 and the fan unit 300 are attached to the radiator 100 by a fastening means such as bolts so that they can be formed into one unit.

Next, the characteristic of this embodiment will be described below.

According to this embodiment, the radiating section 830 is composed so that it can be exposed to air flowing in the intake path 710. Therefore, it is possible to cool the control unit 800 with air, the temperature (about 35° C.) of which is lower than the temperature (about 60° C.) produced when the air passes through the condenser 200 and the radiator 100. Accordingly, the cooling effect (cooling capacity) can be enhanced. Therefore, the size of the radiating section 830 can be reduced, and the structure of the control unit 800 (the mounting structure of the electronic parts 810) can be simplified. As a result, the manufacturing cost of the control unit 800 can be reduced.

(Second Embodiment)

Figure 5:
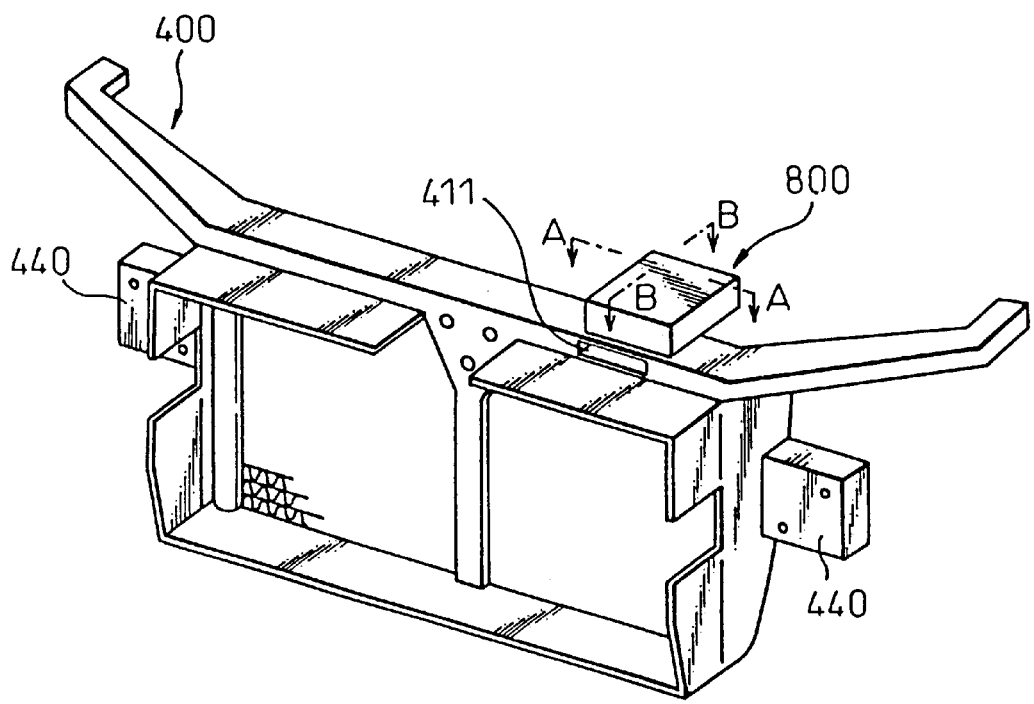
FIG. 5 is a perspective view showing an appearance of a front end section of a vehicle into which a front end panel of the second embodiment of the present invention is incorporated.
Figure 6:
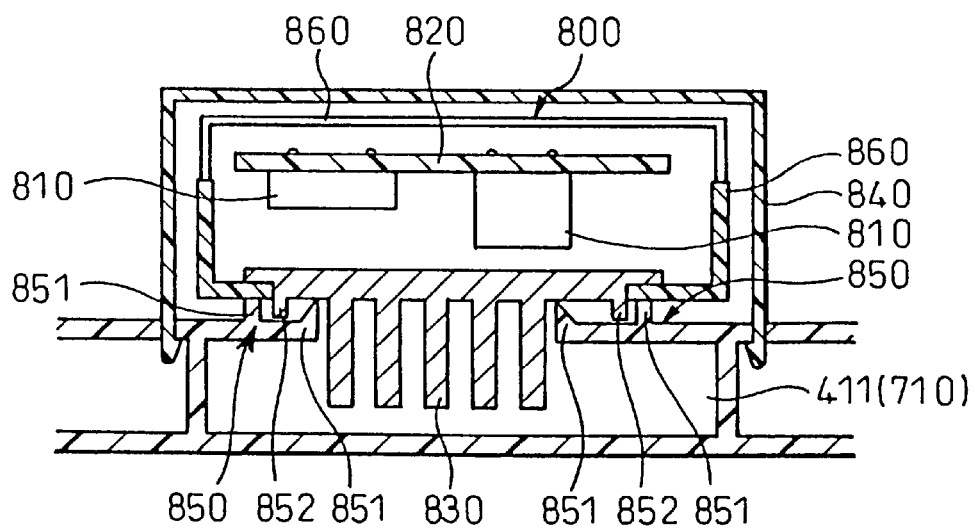
FIG. 6 is a cross-sectional view, taken on line A—A in FIG. 7, of a radiating section of the second embodiment of the present invention.
Figure 7:
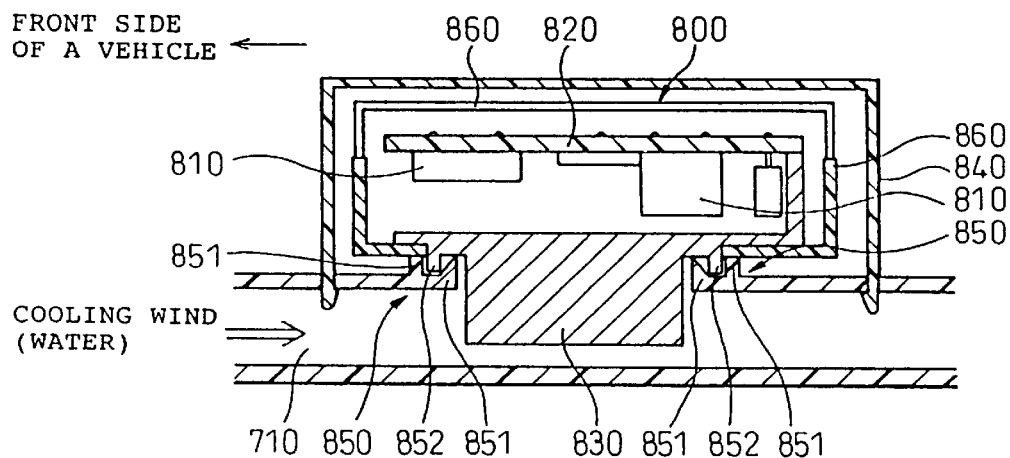
FIG. 7 is a cross-sectional view, taken on line B—B in FIG. 7, of a radiating section of the second embodiment of the present invention.

FIG. 5 is a perspective view showing an appearance of this embodiment. FIGS. 6 and 7 are cross-sectional views showing the characteristic of this embodiment.

As shown in FIGS. 6 and 7, a portion of the radiating section (heat sink and radiating fins) 830 and a portion of the panel body 450 are made to come into contact with each other so as to compose a labyrinth structure 850, and the intake path side 710 of the casing 860 made of resin, in which the mounting board 820 is accommodated, is closed by the radiating section 830 so that the mounting board 820 side and the intake path 710 can be partitioned by the radiating section 830.

In this case, the radiating section 830 is arranged in a lower portion of the casing 860, and the mounting board 820 is arranged on an upper side of the casing 860 while a predetermined interval is formed between the mounting board 820 and the radiating section 830. At the same time, the mounting board 820 is arranged in the casing 860 so that the side of the mounting board 820 on which the wiring pattern (not shown) is provided does not directly face the radiating section 830, that is, the side of the mounting board 820 on which the wiring pattern is provided, can be arranged on the reverse side. In other words, the mounting board 820 is arranged in the casing 860 so that the side of the mounting board 820 opposite to the side on which the electronic parts 810 are mounted, that is, the side of the mounting board on which soldering is done, does not directly face the radiating section 830.

In this second embodiment, in the panel body 450, there is provided a protruding section 851 which comes partially into contact with the radiating section 830. In the radiating section 830, there is provided a protruding section 852 which protrudes onto the panel body 450 side. In this way, the labyrinth structure (mechanical seal section) 850 is composed.

Due to the foregoing, it is possible to prevent water such as rain water, which has entered into the intake path 710, from proceeding into the casing 860. Therefore, it is possible to prevent the mounting board (820) from being covered with water.

In this connection, although rain water is prevented from proceeding into the casing 860 by means of the labyrinth structure (mechanical seal section) 850, when high pressure acts on the intake path 710, for example, when the vehicle is running at high speed, there is a possibility that invasion of rain water cannot be sufficiently prevented.

In this second embodiment, the radiating section 830 is arranged in the lower portion of the casing 860, and the mounting board 820 is arranged on the upper side of the casing 860 while a predetermined interval is provided between the mounting board 820 and the radiating section 830. Due to the above structure, even if rain water passes through the labyrinth structure (mechanical seal section) 850 and proceeds into the casing 860, it is possible to prevent the mounting board 820 from being covered with water.

Further, the mounting board 820 is arranged in the casing 860 so that the side of the mounting board 820, on which the wiring pattern is provided, does not directly face the radiating section 830, that is, the mounting board 820 is arranged in the casing 860 so that the side of the mounting board 820, on which the wiring pattern is provided, can be located on the reverse side. Accordingly, it is possible to prevent the occurrence of damage caused by electric leakage even if the device is covered with water.

(Third Embodiment)

Figure 8:
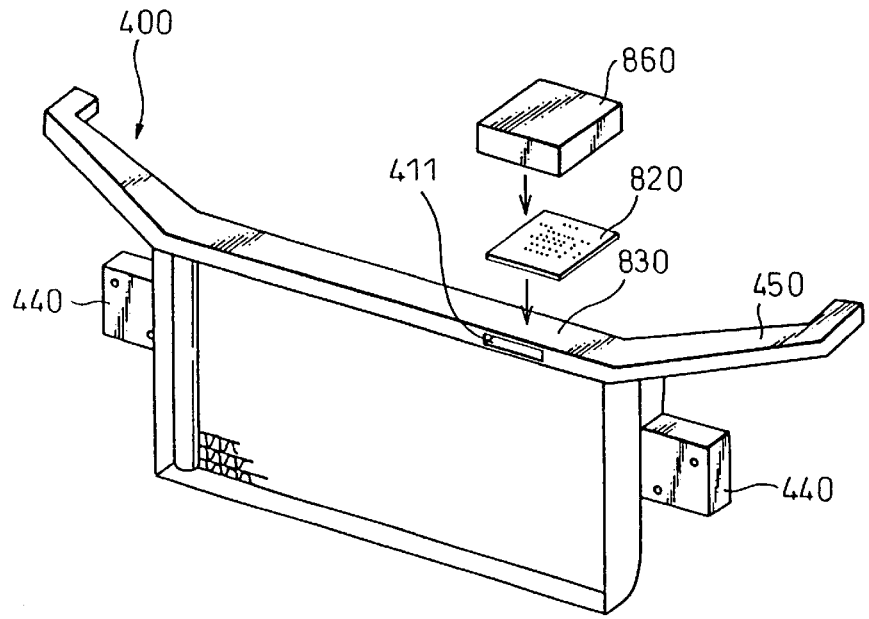
FIG. 8 is an exploded perspective view showing a front end section of a vehicle into which a front end panel of the third embodiment of the present invention is incorporated.

As shown in FIG. 8, the third embodiment, is composed in such a manner that the panel body 450 is made of metal (aluminum in this embodiment) and the radiating section 830 is composed integrally with the panel body 450.

Due to the foregoing, the number of parts can be reduced. Therefore, the manufacturing cost of the control unit 800 and the panel body 450 can be reduced. Since the panel body 450 is made of metal, it is possible to radiate heat from the entire panel body 450, and further the rigidity of the panel body 450 can be enhanced.

(Another Embodiment)

In the first embodiment, the radiating section 830 and the panel body section 450 are integrated with each other by means of insert molding, however, it should be noted that the present invention is not limited to the above specific embodiment. Sections 830, 450 may be made separately from each other.

In the above embodiment, the control unit 800 is cooled by exposing the radiating section 830 to the intake path 710. However, the entire control unit 800 may be arranged in the intake path 710 in the panel body section 450.

Air flowing in the intake path 710 may be introduced into the control unit 800, and the electronic parts 810 may be directly cooled.

The radiating section 830 need not be composed of a different member but a portion of the panel body may be directly exposed to cold air instead of the radiating section 830.

In this connection, the specific embodiments of the present invention are explained in detail in this specification. However, it should be noted that variations may be made by one skilled in the art without departing from the spirit and scope of the invention.

What is claimed is:

1. A front end panel for a vehicle having a front end onto which vehicle front end parts including at least a radiator are incorporated, the front end panel comprising:

an air path adapted to be in communication with air located outside of an engine compartment of the vehicle, the air path allowing air to flow to the rear end of the vehicle while bypassing the radiator, the air path being arranged in a panel body section to which the vehicle front end parts are attached; and a unit attaching section to which a control unit for controlling electric equipment is attached, the unit attaching section being arranged in the panel body section, wherein the control unit is cooled by the air flowing in the air path without having flowed through the engine compartment.

2. A front end panel onto which vehicle front end parts including at least a radiator, which are arranged on the vehicle front end, are incorporated, comprising:

an air path adapted for guiding air into the intake of an internal combustion engine, the air path being arranged in a panel body section to which the vehicle front end parts are attached; and a unit attaching section to which a control unit for controlling electric equipment is attached, the unit attaching section being arranged in the panel body section, wherein the control unit is cooled by the air flowing in the air path.

3. A front end panel according to claim 1, the control unit including: a mounting board for mounting electronic parts; and a radiating section for radiating heat generated by the electronic parts, wherein the radiating section is exposed to the air flowing in the air path.

4. A front end panel according to claim 2, the control unit including: a mounting board for mounting electronic parts; and a radiating section for radiating heat generated by the electronic parts, wherein the radiating section is exposed to the air flowing in the air path.

5. A front end panel according to claim 3, wherein the panel body section is made of resin, the radiating section is made of metal, and the radiating section is integrated with the panel body section.

6. A front end panel according to claim 3, wherein the panel body section is made of metal, and the radiating section is integrated with the panel body section.

7. A front end panel according to claim 1, wherein the panel body section is made of resin, the control unit is composed of a mounting board for mounting electronic parts, a casing for accommodating the mounting board and a radiating section made of metal for radiating heat generated in a casing, and the radiating section comes into contact with a portion of the panel body so that a labyrinth structure is formed and the air path side of the casing is closed.

8. A front end panel according to claim 2, wherein the panel body section is made of resin, the control unit is composed of a mounting board for mounting electronic parts, a casing for accommodating the mounting board and a radiating section made of metal for radiating heat generated in a casing, and the radiating section comes into contact with a portion of the panel body so that a labyrinth structure is formed and the air path side of the casing is closed.

9. A front end panel according to claim 7, wherein the radiating section is located at a lower portion in the casing so that it can be exposed to air flowing in the air path, and the mounting board is arranged on the upper side of the casing while a predetermined interval is kept between the mounting board and the radiating section.

10. A front end panel onto which vehicle front end parts, including at least a radiator, which are arranged on the front end of an engine compartment, are incorporated, comprising:

a unit attaching section to which a control unit for controlling electric equipment is attached, the unit attaching section being arranged in the panel body section to which the vehicle front end parts are attached, wherein air is taken in from outside the engine compartment to bypass the radiator and the control unit is cooled by the air which has been taken in without the air having flowed through the engine compartment.

\* \* \* \* \*